United States Patent
Kim et al.

(10) Patent No.: US 9,273,595 B2
(45) Date of Patent: Mar. 1, 2016

(54) TURBOCHARGER SYSTEM

(71) Applicant: Hyundai Motor Company, Seoul (KR)

(72) Inventors: Jonghyuck Kim, Seoul (KR); Dae Sung Park, Cheonan-si (KR)

(73) Assignee: Hyundai Motor Company, Seoul (KR)

( * ) Notice: Subject to any disclaimer, the term of this patent is extended or adjusted under 35 U.S.C. 154(b) by 66 days.

(21) Appl. No.: 14/094,067

(22) Filed: Dec. 2, 2013

(65) Prior Publication Data
US 2014/0182289 A1     Jul. 3, 2014

(30) Foreign Application Priority Data
Dec. 31, 2012 (KR) .......................... 10-2012-0158621

(51) Int. Cl.
| F02B 37/007 | (2006.01) |
| F02B 37/00 | (2006.01) |
| F02B 33/00 | (2006.01) |
| F01N 13/10 | (2010.01) |
| F01N 13/08 | (2010.01) |
| F02B 75/22 | (2006.01) |
| F02F 1/42 | (2006.01) |
| F02B 75/18 | (2006.01) |

(52) U.S. Cl.
CPC ............. F02B 37/001 (2013.01); F02B 37/007 (2013.01); F02B 75/22 (2013.01); *F02B 2075/1832* (2013.01); *F02F 1/4285* (2013.01); *Y02T 10/144* (2013.01)

(58) Field of Classification Search
CPC .... F02B 37/001; F02B 37/007; F01N 13/107; Y02T 10/144
USPC .............................................. 60/612; 123/562
See application file for complete search history.

(56) References Cited

U.S. PATENT DOCUMENTS

| 4,457,134 | A | * | 7/1984 | Deutschmann ................. 60/612 |
| 4,538,574 | A | * | 9/1985 | Lombardi ..................... 123/432 |
| 5,697,217 | A | * | 12/1997 | Ramsden et al. .............. 60/612 |
| 7,908,860 | B2 | * | 3/2011 | Trombetta et al. ............. 60/612 |
| 2002/0056444 | A1 | * | 5/2002 | Chou et al. .................. 123/559.1 |
| 2008/0289323 | A1 | * | 11/2008 | Diez et al. ....................... 60/323 |
| 2012/0096856 | A1 | * | 4/2012 | Rutschmann et al. .......... 60/612 |
| 2014/0318120 | A1 | * | 10/2014 | Svihla et al. .................... 60/599 |

FOREIGN PATENT DOCUMENTS

| DE | 102012020243 | A1 | * | 12/2012 |
| EP | 1619368 | A1 | * | 1/2006 |
| JP | 05-149142 | A | | 6/1993 |
| JP | 2009-203935 | A | | 9/2009 |

* cited by examiner

*Primary Examiner* — Thomas Denion
*Assistant Examiner* — Jessica Kebea
(74) *Attorney, Agent, or Firm* — Morgan, Lewis & Bockius LLP

(57) ABSTRACT

A turbocharger system includes: an engine including a first cylinder head constituting a first bank and a second cylinder head constituting a second bank; a center turbocharger formed between the first bank and the second bank, and connected to exhaust and intake manifolds of the first and second banks; a first turbocharger connected to the other exhaust and intake manifolds of the first bank; and a second turbocharger connected to the other exhaust and intake manifolds of the second bank.

6 Claims, 5 Drawing Sheets

TURBOCHARGER SYSTEM

CROSS-REFERENCE TO RELATED APPLICATION

The present application claims priority of Korean Patent Application Number 10-2012-0158621 filed Dec. 31, 2012, the entire contents of which application is incorporated herein for all purposes by this reference.

BACKGROUND OF INVENTION

1. Field of Invention

The present invention relates to a turbocharger system, and more particularly to, a turbocharger system which provides low flow resistance and good charging efficiency by reducing the length of intake/exhaust manifolds.

2. Description of Related Art

A turbocharger system is a system that generates a higher power output for a given engine size by forced induction.

An engine with a turbocharger system has higher power output and efficiency, compared to a naturally aspiration engine. This engine forces incoming air to flow in through a turbine, and provides higher efficiency of the engine in proportion to the inflow, compared to engines using atmospheric pressure.

In a turbocharger system using exhaust gases, however, intake air or exhaust air is directed to one side when the system is used on a V-shaped engine. Thus, a turbo is placed within a V-bank, or only two turbos are used, one on each side of the engine.

Alternatively, a turbocharger is placed outside the engine, an intake manifold is located at the center of the engine, and an exhaust manifold is located at the outside. Thus, air drawn from the outside is compressed by the turbocharger. Accordingly, a long flow path is used for supply to the intake manifold, which causes a pressure drop and results in a decrease in intake efficiency.

Moreover, since the system cannot have more than two turbochargers, turbo lag increases and high power output cannot be attained.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to provide a turbocharger system which provides low flow resistance and good charging efficiency by reducing the length of intake/exhaust manifolds.

Various aspects of the present invention provide for a turbocharger system including: an engine including a first cylinder head constituting a first bank and a second cylinder head constituting a second bank; a center turbocharger formed between the first bank and the second bank, and connected to exhaust and intake manifolds of the first and second banks; a first turbocharger connected to the other exhaust and intake manifolds of the first bank; and a second turbocharger connected to the other exhaust and intake manifolds of the second bank.

The first cylinder head and the second cylinder head may have the same shape, and therefore the exhaust and intake manifolds of both cylinder heads may be formed in the same direction.

The engine may be a V8 engine.

First, third, fifth, and seventh cylinders may be sequentially formed in the first bank, and second, fourth, sixth, and eighth cylinders may be sequentially formed in the second bank, and the exhaust manifolds of the first, fourth, sixth, and seventh cylinders may be connected to the turbine of the center turbocharger, and the intake manifolds of the second, third, fifth, and eighth cylinders may be connected to the compressor of the center turbocharger.

The exhaust manifolds of the third and fifth cylinders may be connected to the turbine of the first turbocharger, and the intake manifolds of the first and seventh cylinders may be connected to the compressor of the first turbocharger.

The exhaust manifolds of the second and eighth cylinders may be connected to the turbine of the second turbocharger, and the intake manifolds of the fourth and sixth cylinders may be connected to the compressor of the second turbocharger.

The engine may be ignited in the order of the first, second, seventh, eighth, fourth, fifth, sixth, and third cylinders.

Various aspects of the present invention provide for a turbocharger system including: an engine including a first bank having first, third, fifth, and seventh cylinders sequentially formed therein and a second bank having second, fourth, sixth, and eighth cylinders sequentially formed therein; a center turbocharger formed between the first bank and the second bank, and connected to exhaust and intake manifolds of the first and second banks; a first turbocharger connected to the other exhaust and intake manifolds of the first bank; and a second turbocharger connected to the other exhaust and intake manifolds of the second bank.

The exhaust manifolds of the first, fourth, sixth, and seventh cylinders may be connected to the turbine of the center turbocharger, and the intake manifolds of the second, third, fifth, and eighth cylinders may be connected to the compressor of the center turbocharger, and the exhaust manifolds of the third and fifth cylinders may be connected to the turbine of the first turbocharger, and the intake manifolds of the first and seventh cylinders may be connected to the compressor of the first turbocharger, and the exhaust manifolds of the second and eighth cylinders may be connected to the turbine of the second turbocharger, and the intake manifolds of the fourth and sixth cylinders may be connected to the compressor of the second turbocharger.

The engine may be ignited in the order of the first, second, seventh, eighth, fourth, fifth, sixth, and third cylinders.

According to various aspects of the present invention, low flow resistance and good charging efficiency can be attained by reducing the length of intake/exhaust manifolds.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
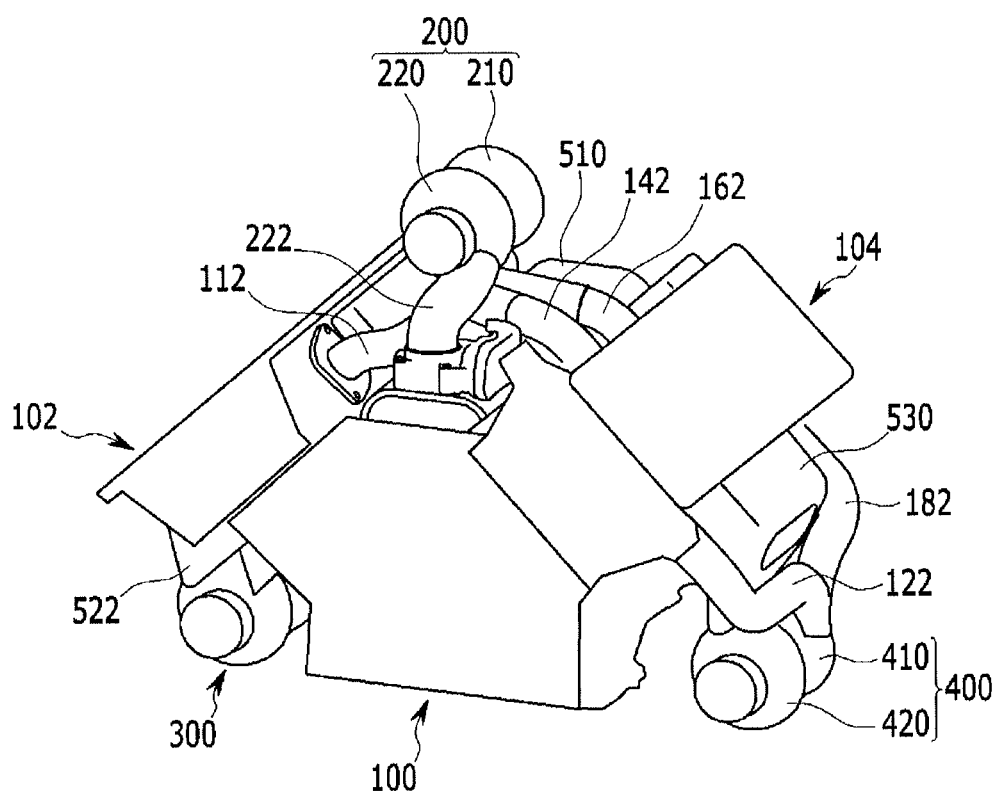
FIG. 1 is a perspective of an exemplary turbocharger system in accordance with the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification, the same reference numerals represent the same components.

In the drawings, the thickness of layers, films, panels, regions, etc., are exaggerated for clarity.

It will also be understood that when an element such as a layer, film, area, or plate is referred to as being "on" another element, it can be directly on the other element, or one or more intervening element may also be present.

In contrast, when an element is referred to as being "directly on" another element, there are no intervening elements present.

Throughout the specification, unless explicitly described to the contrary, the word "comprise" and variations such as "comprises" or "comprising", will be understood to imply the inclusion of stated elements but not the exclusion of any other elements.

Figure 2:
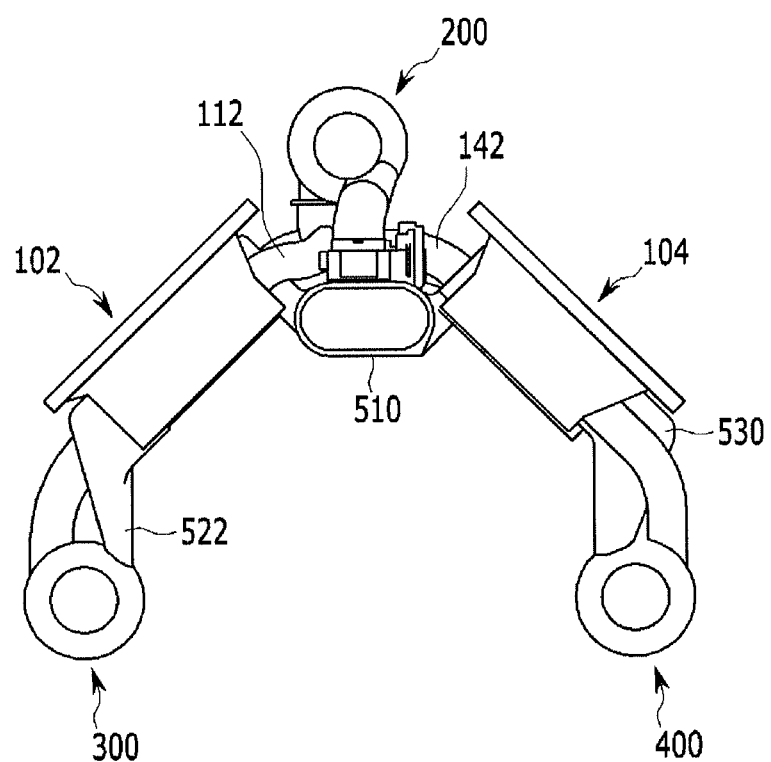
FIG. 2 is a front elevation view of the turbocharger system of FIG. 1.

FIG. 1 is a perspective of a turbocharger system in accordance with various embodiments of the present invention. FIG. 2 is a front elevation view of the turbocharger system in accordance with various embodiments of the present invention.

Figure 3:
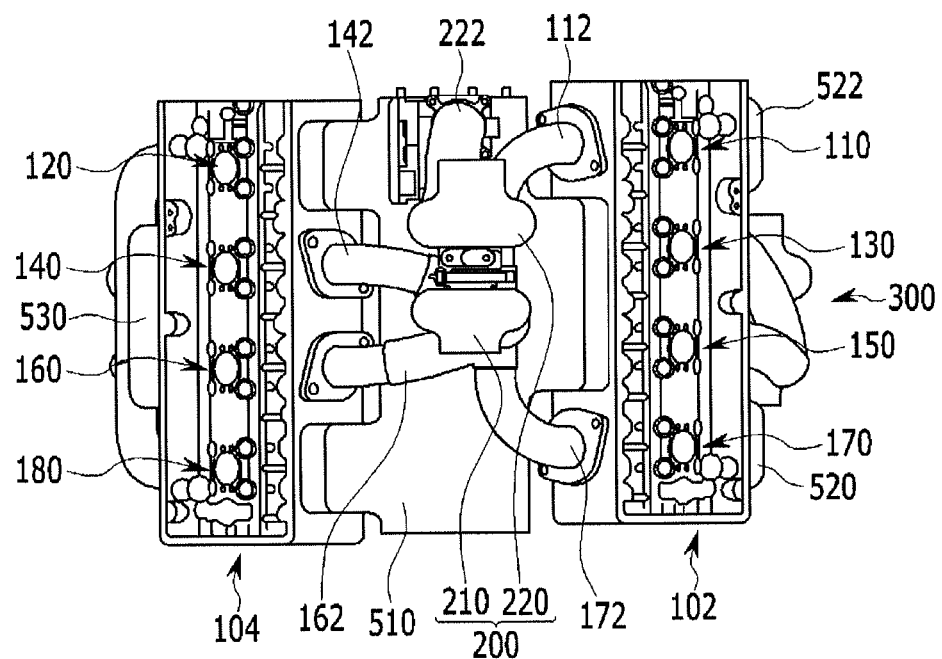
FIG. 3 is a top plan view of the turbocharger system of FIG. 1.
Figure 4:
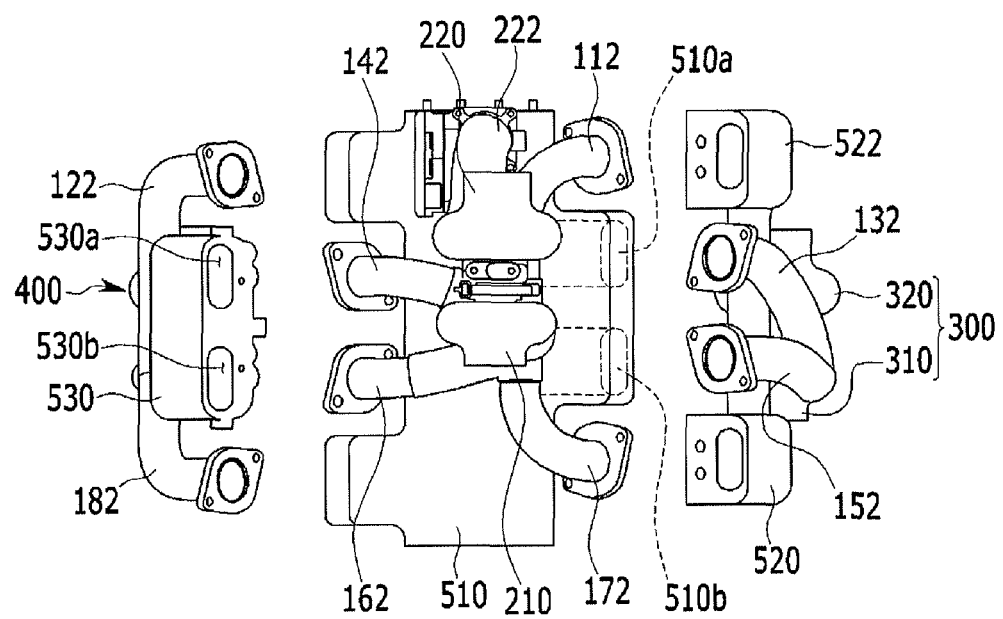
FIG. 4 is a top plan view of the turbocharger system of FIG. 1, except for the engine.

FIG. 3 is a top plan view of the turbocharger system in accordance with various embodiments of the present invention. FIG. 4 is a top plan view of the turbocharger system, except for the engine, in accordance with various embodiments of the present invention.

Hereinafter, a turbocharger system in accordance with various embodiments of the present invention will be described with reference to FIGS. 1 to 4.

The turbocharger system in accordance with various embodiments of the present invention includes: an engine 100 including a first cylinder head constituting a first bank 102 and a second cylinder head constituting a second bank 104; a center turbocharger 200 formed between the first bank 102 and the second bank 104, and connected to exhaust and intake manifolds of the first and second banks 102 and 104; a first turbocharger 300 connected to the other exhaust and intake manifolds of the first bank 102; and a second turbocharger 400 connected to the other exhaust and intake manifolds of the second bank 104.

First, third, fifth, and seventh cylinders 110, 130, 150, and 170 are sequentially formed in the first bank 102, and second, fourth, sixth, and eighth cylinders 120, 140, 160, and 180 are sequentially formed in the second bank 104.

The engine 100 is ignited in the order of the first, second, seventh, eighth, fourth, fifth, sixth, and third cylinders 110, 120, 170, 180, 140, 150, 160, and 130.

The exhaust manifolds of the first to eighth cylinders 110 to 180 are defined as the first to eighth exhaust manifolds 112 and 182.

The exhaust manifolds 112, 142, 162, and 172 of the first, fourth, sixth, and seventh cylinders 110, 140, 160, and 170 may be connected to the turbine of the center turbocharger 200, and the intake manifolds of the second, third, fifth, and eighth cylinders 120, 130, 150, and 180 may be connected to the compressor of the center turbocharger 200.

The exhaust manifolds 132 and 152 of the third and fifth cylinders 130 and 150 may be connected to the turbine of the first turbocharger 300, and the intake manifolds of the first and seventh cylinders 110 and 170 may be connected to the compressor of the first turbocharger 300.

The exhaust manifolds 122 and 182 of the second and eighth cylinders 120 and 180 may be connected to the turbine of the second turbocharger 400, and the intake manifolds of the fourth and sixth cylinders 140 and 160 may be connected to the compressor of the second turbocharger 400.

The figures illustrate a center turbocharger turbine housing 210 and center turbocharger compressor housing 220 of the center turbocharger 200, a first turbocharger turbine housing 310 and first turbocharger compressor housing 320 of the first turbocharger 300, and a second turbocharger turbine housing 410 and second turbocharger compressor housing 420 of the second turbocharger 400.

Turbines are respectively provided within the turbine housings 210, 310, and 410, and compressors are respectively provided within the compressor housings 220, 320, and 420. The turbines drive the compressors by exhaust gases coming out of the cylinders connected to the turbine housings 210, 310, and 410, and the compressors compress outside fresh air and supply the compressed air to the cylinders connected to the compressor housings 2210, 320, and 420.

Also, the figures illustrate a center intake manifold 510 connected to the center turbocharger compressor housing 220, a first intake manifold 520 and second intake manifold 522 connected to the first turbocharger compressor housing 320, and a third intake manifold 530 connected to the second turbocharger compressor housing 420.

The center intake manifold 510 is connected to the second, third, fifth, and eighth cylinders 120, 130, 150, and 180 through an intake line 222 to supply them with compressed air.

The first intake manifold 520 is connected to the seventh cylinder 170 to supply it with compressed air, and the second intake manifold 522 is connected to the first cylinder 110 to supply it with compressed air.

The third intake manifold 530 is connected to the fourth and sixth cylinders 140 and 160 to supply them with compressed air.

Figure 5A:
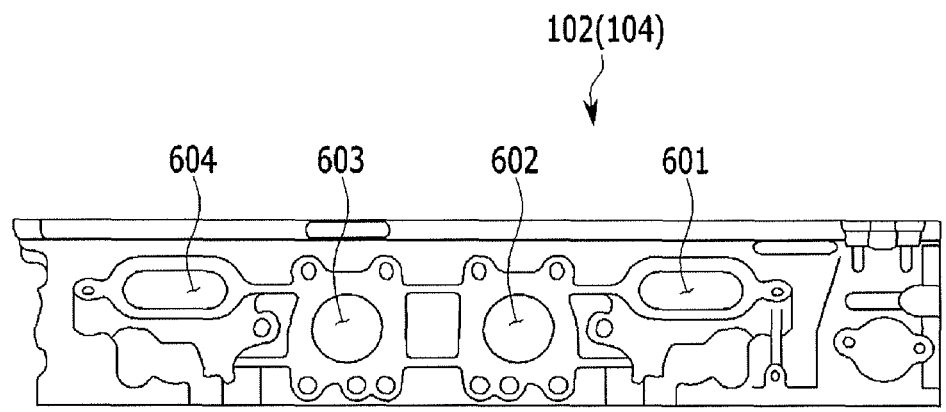
FIGS. 5A and 5B are views showing a cylinder head of the turbocharger system of FIG. 1.
Figure 5B:
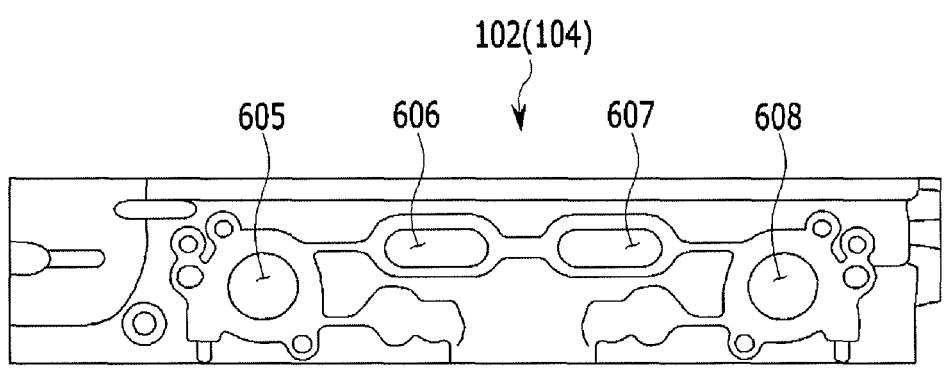

FIG. 5 is a view showing a cylinder head of a turbocharger system according to various embodiments of the present invention.

Referring to FIG. 5, the first cylinder head and the second cylinder head may have the same shape, and therefore the exhaust and intake manifolds of both cylinder heads may be formed in the same direction. The engine 100 may be a V8 engine.

That is, referring to FIG. 3 and (a) of FIG. 5, a first inlet 601, a first outlet 602, a second outlet 603, and a second inlet 604 are formed on the right sides of the first, third, fifth, and seventh cylinders 110, 130, 150, and 170 of the first bank 102, respectively, that is, on the outer side of the first bank 102, and are connected with the second intake manifold 522, the third exhaust manifold 132, the fifth exhaust manifold 152, and the first intake manifold 520 respectively.

Further, a first inlet 601, a first outlet 602, a second outlet 603, and a second inlet 604 having the same shapes are also formed on the right sides of the second, fourth, sixth, and eighth cylinders 120, 140, 160, and 180 of the second bank, respectively, that is, on the inner side of the second bank 104, and are connected with one line of the center intake manifold 510, the fourth exhaust manifold 142, the sixth exhaust manifold 162, and the other line of the center intake manifold 510, respectively.

Referring to FIG. 3 to (b) of FIG. 5, a third outlet 605, a third inlet 606, a fourth inlet 607, and a fourth outlet 608 are formed on the left sides of the first, third, fifth, and seventh cylinders 110, 130, 150, and 170 of the first bank 102, respectively, that is, on the inner side of the first bank 102, and are connected with the first exhaust manifold 112, first and second lines 510a and 510b of the center intake manifold 510, and the seventh exhaust manifold 172.

A third outlet 605, a third inlet 606, a fourth inlet 607, and a fourth outlet 608 having the same shapes are also formed on the left sides of the second, fourth, sixth, and eighth cylinders 120, 140, 160, and 180 of the second bank 104, respectively, that is, on the outer side of the second bank 104, and are connected with the second exhaust manifold 122, first and second lines 530a and 530b of the third intake manifold 530, and the eighth exhaust manifold 182.

That is, the first cylinder head and the second cylinder head that constitute the first bank 102 and the second bank 104 have the same shape. The first and second banks 102 and 104 may be formed by using a single common head. Accordingly, the production costs of engines can be lowered by using the turbocharger system in accordance with various embodiments of the present invention.

Moreover, the turbocharger system in accordance with various embodiments of the present invention can achieve higher power output with the use of three turbochargers, and also can improve turbo lag and avoid exhaust interference since the engine 100 is ignited in the order of the first, second, seventh, eighth, fourth, fifth, sixth, and third cylinders 110, 120, 170, 180, 140, 150, 160, and 130.

In addition, the turbocharger system in accordance with various embodiments of the present invention can allows for an air supply path to have a shorter length, thereby reducing pressure loss.

For convenience in explanation and accurate definition in the appended claims, the terms front, left or right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A turbocharger system comprising:
   an engine including a first cylinder head constituting a first bank, and a second cylinder head constituting a second bank, wherein first, third, fifth, and seventh cylinders are sequentially formed in the first bank, and second, fourth, sixth, and eighth cylinders are sequentially formed in the second bank;
   a center turbocharger formed between the first bank and the second bank;
   a first turbocharger; and
   a second turbocharger,
   wherein exhaust lines of the first, fourth, sixth, and seventh cylinders are operably connected to a turbine of the center turbocharger via a first exhaust manifold, and
   a first intake manifold is connected to a compressor of the center turbocharger, wherein intake lines of at least one of the second, third, fifth, and eight cylinders are operably connected to the first intake manifold;
   wherein exhaust lines of the third and fifth cylinders are connected to a turbine of the first turbocharger via a second exhaust manifold and a second intake manifold is connected to a compressor of the first turbocharger wherein the intake lines of at least one of the first and seventh cylinders are operably connected to the second intake manifold; and
   wherein exhaust lines of the second and eighth cylinders are connected to a turbine of the second turbocharger via a third exhaust manifold and a third intake manifold is connected to a compressor of the second turbocharger wherein the intake lines of the least one of the fourth and sixth cylinders are operably connected to the third intake manifold.

2. The turbocharger of claim 1, wherein the first cylinder head and the second cylinder head are symmetrical to each other, and the exhaust lines of the third and fifth cylinders extend toward the first turbocharger in a direction opposite to a direction in which the exhaust lines of the second and eighth cylinders extend toward the second turbocharger.

3. The turbocharger system of claim 2, wherein the engine is a V8 engine.

4. The turbocharger system of claim 1, wherein the engine is ignited in the order of the first, second, seventh, eighth, fourth, fifth, sixth, and third cylinders.

5. A turbocharger system comprising:
   an engine comprising a first bank having first, third, fifth, and seventh cylinders sequentially formed therein and a second bank having second, fourth, sixth, and eighth cylinders sequentially formed therein;
   a center turbocharger formed between the first bank and the second bank;
   a first turbocharger; and
   a second turbocharger,
   wherein exhaust lines of the first, fourth, sixth, and seventh cylinders are operably connected to a turbine of the center turbocharger via a first exhaust manifold, and
   a first intake manifold is connected to a compressor of the center turbocharger wherein intake lines of at least one of the second, third, fifth, and eight cylinders are operably connected to the first intake manifold;
   wherein exhaust lines of the third and fifth cylinders are connected to a turbine of the first turbocharger via a second exhaust manifold, and a second intake manifold is connected to a compressor of the first turbocharger, wherein the intake lines of at least one of the first and seventh cylinders are operably connected to the second intake manifold; and
   wherein exhaust lines of the second and eighth cylinders are connected to a turbine of the second turbocharger via a third exhaust manifold, and a third intake manifold is connected to a compressor of the second turbocharger, wherein the intake lines of the least one of the fourth and sixth cylinders are operably connected to the third intake manifold.

6. The turbocharger system of claim 5, wherein the engine is ignited in the order of the first, second, seventh, eighth, fourth, fifth, sixth, and third cylinders.

* * * * *